United States Patent [19]

Rosenberg

[11] 4,116,216

[45] Sep. 26, 1978

[54] REMOTELY ACTUATED VALVES AND FLUID DISTRIBUTION SYSTEM INCLUDING SAME

[76] Inventor: Peretz Rosenberg, Moshav Beit Shearim, Israel

[21] Appl. No.: 713,616

[22] Filed: Aug. 11, 1976

[30] Foreign Application Priority Data

Jul. 1, 1976 [IL] Israel .................................. 49947

[51] Int. Cl.² .............................................. A01G 25/02
[52] U.S. Cl. .......................... 137/624.13; 137/624.18; 239/66; 251/230
[58] Field of Search ..................... 239/66; 137/624.11, 137/624.13, 624.15, 624.18, 624.2; 251/230

[56] References Cited

U.S. PATENT DOCUMENTS

| | | | |
|---|---|---|---|
| 2,793,908 | 5/1957 | Carver | 239/66 |
| 3,018,788 | 1/1962 | Perlis | 239/66 X |
| 3,408,006 | 10/1968 | Stanwood | 239/66 |

*Primary Examiner*—Alan Cohan
*Attorney, Agent, or Firm*—Benjamin J. Barish

[57] ABSTRACT

A valve comprises a steppable counting mechanism stepped with each new application of pressurized fluid to its inlet and effective to cause the valve member to open (or close) after the counting mechanism has been stepped a predetermined number of times, whereby the valve may be opened (or closed) by merely controlling the number of times pressurized fluid is applied to the valve inlet. The steppable counting mechanism includes a pair of nestable cup-shaped members in which the inner one is fixed to the housing and the outer one is rotatably coupled to a valve member within the housing which is reciprocated with each application of pressurized fluid to the housing inlet.

Also described is a fluid distribution system including a plurality of such valves connected to a common supply line wherein the valve counting mechanisms are preset to be actuated at different counts such that the valves can be selectively actuated from a common remote location by the number of times the pressurized fluid is turned on and off in the common supply line.

4 Claims, 5 Drawing Figures

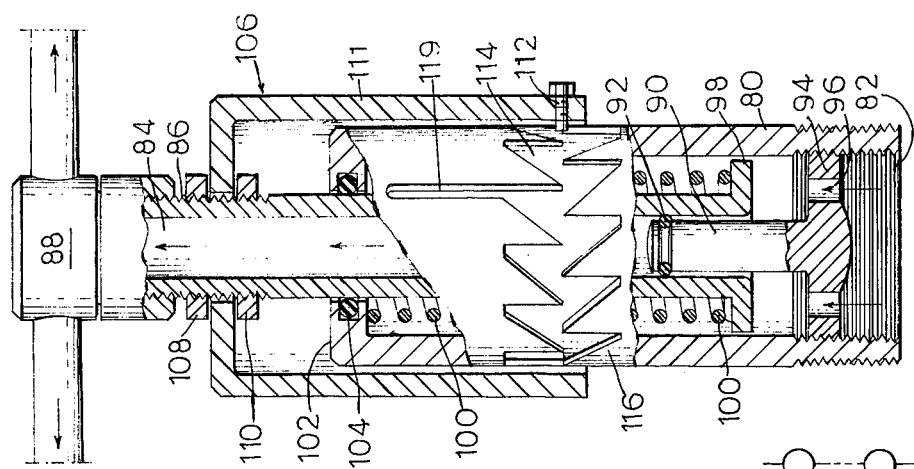
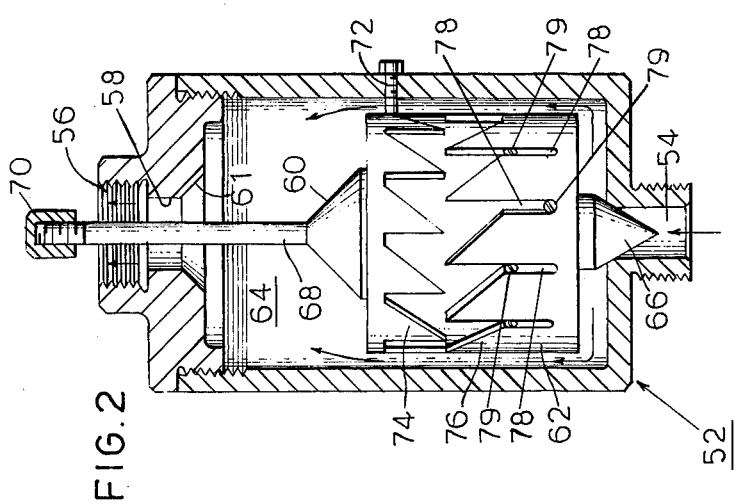
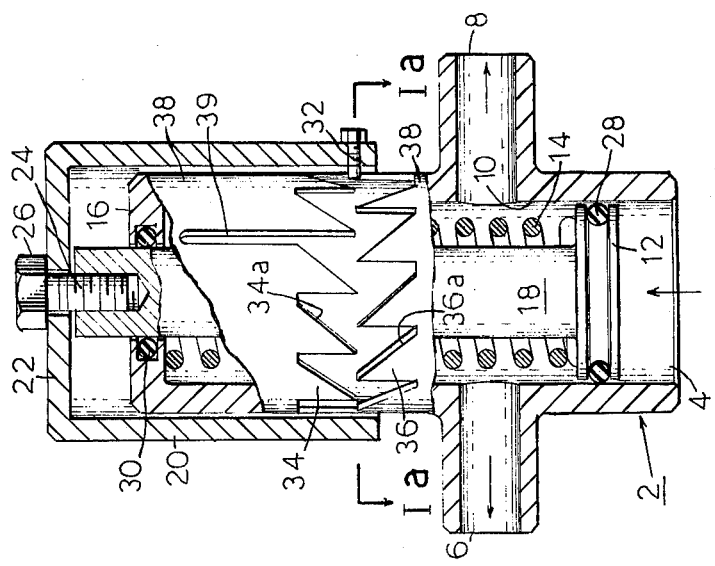
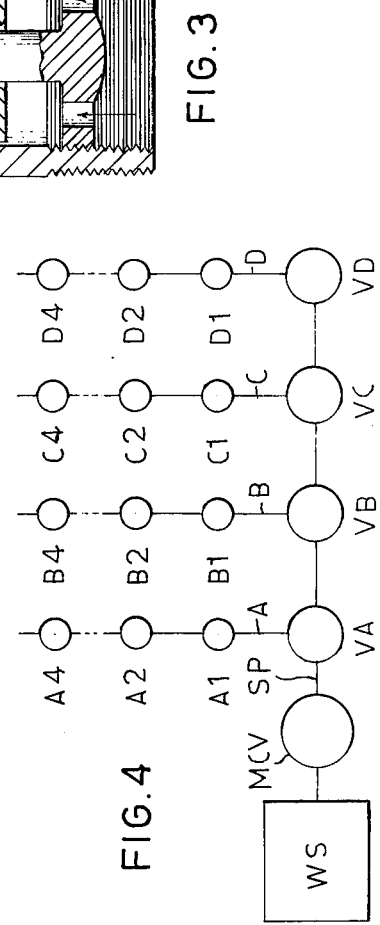
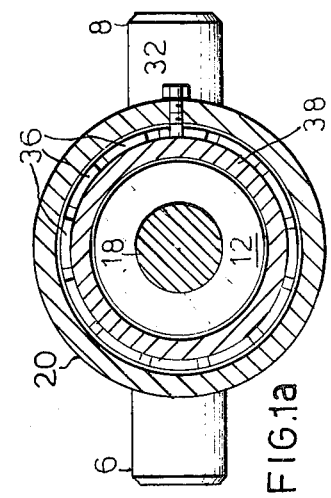

REMOTELY ACTUATED VALVES AND FLUID DISTRIBUTION SYSTEM INCLUDING SAME

BACKGROUND OF THE INVENTION

The present invention relates to valves, and particularly to valves which may be actuated from a remote location. The invention is particularly applicable for use in fluid distribution systems, such as water irrigation systems, for selectively controlling the operation of valves from a remote location, and is therefore described below with respect to such an application.

A number of fluid distribution systems have been developed having means for selectively controlling the valves from a remote location. The known systems usually include electrical controls such as solenoids, or hydraulic controls, for controlling the valves. Such systems, however, are very complicated and are therefore expensive to produce, install, and maintain. A number of valves are known which include steppable counting mechanisms for actuating the valve to either open or close it after a predetermined number of times pressurized fluid is applied to the valve inlet. Generally speaking, the known valves of this type are of relatively complicated and/or unreliable construction, and therefore have not found wide-spread use.

OBJECTS AND SUMMARY OF THE INVENTION

An object of the present invention is to provide a new form of valve which is of simple, inexpensive and reliable construction and which permits its control from a remote location in a convenient and efficient manner.

According to one aspect of the present invention, there is provided a valve comprising a housing having an inlet for pressurized fluid, an outlet for the pressurized fluid, and a passageway connecting the inlet to the outlet; a valve member actuatable to open or close the passageway; and a steppable counting mechanism stepped with each new application of pressurized fluid to the inlet and effective to actuate the valve member to open or close said passageway after the counting mechanism has been stepped a predetermined number of times, whereby the valve may be controlled by merely controlling the number of times the pressurized fluid is applied to the valve inlet. More particularly, the steppable counting mechanism comprises a pair of nestable cup-shaped members including an inner one fixed to and closing one end of the housing, and an outer one rotatably coupled to the valve member so as to be reciprocated therewith. The steppable counting mechanism further includes cooperable indexing elements carried by the two cup-shaped members which elements are effective to rotate the outer one one step around the inner one and around the valve member with each reciprocation of the valve member.

It will thus be seen that such a valve may be remotely controlled to open or close by merely controlling the pressurized fluid supply itself, thereby obviating the need for a separate electrical or hydraulic control network. Since the valve in effect controls itself to operate at a predetermined time (i.e., after the application of the pressurized fluid to its inlet a predetermined number of times), such a valve may be called a "smart" valve.

Many different arrangements of counting mechanisms may be used, and many different applications of the invention may be made. The accompanying drawings illustrate several preferred embodiments of the invention for purposes of example only. In the drawings:

BRIEF DESCRIPTION OF THE DRAWINGS

FIGS. 1–3 are longitudinal sectional views of three different types of valves constructed in accordance with the invention, FIG. 1a being a section view along line 1a of FIG. 1; and FIG. 4 is a diagrammatic view illustrating one form of fluid distribution system including the valves of the present invention.

DESCRIPTION OF THE PREFERRED EMBODIMENTS

The valve of FIG. 1 is one which is normally closed but is automatically opened after the pressurized fluid has been applied to the valve inlet a predetermined number of times. It includes a housing, generally designated 2, formed with an inlet 4, a pair of outlets 6, 8, and a passageway 10 through which the pressurized fluid flows from the inlet to the outlets. Disposed within inlet 4 is a valve member in the form of a piston 12 urged by a spring 14 (bearing against end wall 16 of the housing) to its closed position, i.e. blocking the passageway 10 to outlets 6, 8. Piston 12 is fixed to one end of a stem 18, the opposite end of the stem extending through an opening in the housing end wall 16. End wall 16 is part of a cup-shaped member or section 38 fixed to the housing 2 in alignment with piston stem 18. A cup-shaped member 20 disposed coaxially to housing inlet 4 and nestably receiving the cup-shaped housing section 38, includes an end wall 22 loosely received on the reduced diameter tip 24 of the stem and is retained thereon by a threaded nut 26. Piston 12 is sealed with respect to the inner surface of the housing inlet 4 by an O-ring 28, and a further O-ring 30 is provided in the housing end wall 16 opening through which stem 18 passes.

The side wall of the cup-shaped member 20 carries a fixed pin 32 projecting into the interior of the member. Pin 32 cooperates with two groups of teeth 34, 36 formed in the outer surface of the upper section 38 of housing 4 above the outlet openings 6, 8. Each of the teeth 34, 36 includes inclined surfaces 34a, 36a spaced from each other along the horizontal direction in FIG. 1. The two groups of teeth are in a staggered relationship to each other, and their surfaces 34a, 36a are inclined in opposite senses. In addition, one of the upper teeth 34 is provided with an elongated slot 39.

The arrangement is such that when pressurized fluid is applied to inlet 4 of the valve housing, piston 12 is moved upwardly against spring 14, but its upward movement is normally limited by pin 32 carried by the cup-shaped member 20 limiting against the root (i.e. upper end) of one of the upper teeth 34. This limited movement of piston 12 is insufficient for it to unblock passageway 10 to outlets 6, 8, so that the valve remains closed; the pressurized fluid is therefore not normally transmitted from its inlet 4 to its outlets 6, 8.

This movement of the piston 12 also causes pin 32 to move along the inclined surface 34a of the engaged tooth, and thereby to rotate (rightwardly in FIG. 1) the cup-shaped member 20 one half step. When the pressurized fluid at the inlet 4 terminates, spring 14 returns piston 12 to its normal (illustrated) position, whereby pin 32 moves along inclined surface 36a of the tooth 36 with which it is then aligned, to rotate the cup-shaped member 20 another one half step. It will thus be seen that for each application and termination of pressurized fluid to inlet 4, the cup-shaped member 20 is rotated one full step or increment.

When the cup-shaped member 20 has been rotated a sufficient number of steps, until pin 32 becomes aligned with elongated slot 39, the slot will permit the next application of the pressurized fluid to inlet 4 to displace pin 32 a larger amount in the vertical direction, sufficient to cause piston 12 to clear passageway 10 to the outlets 6, 8. The valve will be opened at this time, and the pressurized fluid applied to inlet 4 will be permitted to flow to the outlets 6, 8.

It will thus be seen that the movable cup-shaped member 20 including its pin 32, and the fixed portion 38 of the housing 4 including its teeth 34, 36 and its elongated slot 39, act as a mechanical counting mechanism which actuates the valve member (piston 12) after the counting mechanism has been stepped a predetermined number of increments by the pressurized fluid applied to the inlet.

In the example of FIG. 1, the valve is normally closed but is actuated to open after a predetermined count of the times the pressurized fluid is applied to its inlet. However, it will be appreciated that the valve member could be controlled by the counting mechanism in other manners.

FIG. 2, for example, illustrates an arrangement wherein the valve member is normally open but is actuated to close after a predetermined count. Such an arrangement is particularly useful in a pilot valve for controlling another device, such as a hydraulic valve.

The valve of FIG. 2 includes a housing 52 formed with an inlet 54 at one end and an outlet 56 at its opposite end, the latter being joined to the inlet by a passageway 58 adapted to be opened and closed by a valve member 60 engaging a conical seat 61. Valve member 60 constitutes the upper end of a tubular float 62 movable within internal chamber 64 of housing 52. The lower end of float 62 is formed with a conical stem 66 seatable within the opening leading from inlet 34 into chamber 64. The upper end of float 62 carries an upper stem 68 projecting through passageway 54 and outlet 56, and terminating in a hand-grip 70.

The side wall of housing 52 is provided with a fixed pin 72 which cooperates, in the manner described above, with two groups of teeth 74, 76 formed around float 62. Each of the lower teeth 76 includes an elongated slot 78, comparable to slot 39 in FIG. 1, and a stop 79 (e.g. a threaded pin) which may be preset to a lower position (as shown with respect to the middle slot in FIG. 2) or a higher position in its respective slot. Presetting stop 79 to the lower position, as illustrated in the middle slot of FIG. 2, makes the slot effective to function as slot 39 in FIG. 1.

The valve of FIG. 2 operates as follows. Normally, the weight of float 62 causes its lower stem 66 to seat within the opening at the inlet 54 of the housing, thereby closing the opening. When pressurized liquid is applied to the inlet 54, this lifts float 62, permitting the liquid to enter the internal chamber 64, whereupon the float rises. Now, if stop 79 in the lower tooth 76 aligned with pin 72 is in its upper position, float 62 will be limited in its upward movement such that valve member 60 does not seat against seat 61; whereas if the stop 79 is in its lower position (as shown by the stop 79 in the middle slot in FIG. 2), the float will be permitted to rise such that valve member 60 seats against conical seat 61 and thereby closes the passageway 58 to the outlet 56.

Each time float 62 rises, it is rotated one-half step (clockwise) by the engagement of pin 72 with respect to the inclined surface of one of the lower teeth 76, and each time the pressure at the inlet is terminated, the float drops by its own weight and is incremented the second one-half step by the engagement of pin 72 with respect to an upper tooth 74.

It will thus be seen that the valve of FIG. 2 is normally retained opened for each count in which pressurized fluid is applied to its inlet, and is closed only after a predetermined count, which is opposite to the operation of the valve in FIG. 1. The valve of FIG. 2 may be used as a pilot valve for controlling another valve or hydraulic device (not shown) to actuate same after the pilot valve has been pulsed a predetermined number of times. Handle 70 is provided to enable the manual closing of the pilot valve of FIG. 2 by manually bringing its valve member 60 against seat 61.

FIG. 3 illustrates a valve construction operating similar to that of FIG. 1 incorporated into a sprinkler to enable the remote control (turn-on) of the sprinkler only after pressurized fluid has been applied to its inlet a predetermined number of times.

The valve in FIG. 3 includes a housing 80 having an inlet 82 at one end and an outlet 84 at the opposite end. Outlet 84 is constituted by a tube 86 projecting through the upper end of housing 80 and carrying a sprinkler head 88. The lower end of tube 86 is received within a fixed piston in the form of a rod 90 having an O-ring 92, the rod being fixed within housing 80 by means of a threaded disc 94 formed with a plurality of openings 96. The lower end of tube 86 is provided with an out-turned annular flange 98 of smaller outer diameter than the inner diameter of housing 80, and a spring 100 is interposed between flange 98 and the upper end wall 102 of housing 80. Tube 86 projects through an opening in end wall 102, which opening is bordered by an O-ring 104.

A cup-shaped member 106 is secured to tube 86 by a pair of threaded nuts 108, 110. Member 106 is nestable over the upper cup-shaped section of the housing 102 and includes a depending skirt 111 carrying a pin 112 at its lower end. Pin 112 cooperates with a pair of teeth formations 114, 116 in the same manner as pin 32 cooperates with teeth 34, 36 in FIG. 1, one (or more) of the upper teeth 114 including an elongated slot 119 corresponding to slot 39 in FIG. 1.

It will thus be seen that with each application of pressurized fluid to inlet 82, tube 86 will rise. Normally, its movement will be limited by pin 112 abutting against the root of one of the upper teeth 34, such that the lower flanged end 98 of tube 86 will not pass over the O-ring 92 carried by the internal rod 90. Accordingly, in such cases no water will be supplied from the inlet via outlet 84 to the sprinkler head 88. As in FIG. 1, with each such application of the pressurized fluid, the counting mechanism will be stepped one-half increment (in this case member 111 rotates one-half increment), and as soon as the supply of pressurized fluid to the inlet is terminated, it will be incremented the second one-half step. When member 111 has been incremented to the point where its pin 112 becomes aligned with the elongated slot 119, this will permit tube 86 to rise to a higher distance, until the lower end of the tube clears the O-ring 92, thereby supplying the pressurized water via outlet 84 to the sprinkler head 88.

FIG. 4 illustrates a water irrigation system including the valves of the present invention to enable the control of the water distribution from a remote location. Thus, the system includes a central water supply WS supplying water via a single water supply line SP controlled by a main control valve MCV to a plurality of branch lines A–D each including a plurality of water sprinklers, namely A1–A4 in line A, B1–B4 in line B, C1–C4 in line C, and D1–D4 in line D. Each branch line A–D is controlled by a control valve VA–VD, respectively.

The control valves VA–VD may each be according to the structure illustrated in FIG. 1 but preset to operate at a different count, and the sprinklers A1–A4—D-1–D4 may each be according to the structure illustrated in FIG. 3 but also preset to operate at a different count. For example, the valves VA–VD may be preset so that valve VA is opened at counts 1–4, valve VB is opened at counts 5–8, valve VC is opened at counts 9–12, and valve VD is opened at counts 13–16; and all the sprinklers may be preset to open only at each fourth count. In such an arrangement, the main control valve MCV may be controlled (e.g., automatically by a timer, or manually) to open and close the main water supplied via line SP to individually activate sprinklers A1–A4 sequentially, then sprinklers B1–B4, then sprinklers C1–C4, and then sprinklers D1–D4, each new application of the pressurized water to line SP activating only one sprinkler and deactivating the previously activated sprinkler. Thus the water supply line upstream of the sprinklers need be constructed to supply only one (or a few) sprinklers at a time, thereby producing a very substantial cost savings in the installation.

Any sequence of control can be provided by appropriately presetting the valves, and the system could include additional branches, sub-branches, or sub-sub-branches as desired for any particular application all selectively controlled as described above. The presetting arrangement illustrated in FIG. 2 could of course be used in FIGS. 1 and 3. Further, the counting mechanisms used could take many different forms, as many such mechanisms are well known in mechanical counters generally. Those included in the described embodiments are shown for purposes of example only.

Many other variations, modifications and applications of the illustrated embodiments of the invention will also be apparent.

What is claimed is:

1. A valve comprising: a housing having an inlet for pressurized fluid, an outlet for the pressurized fluid, and a passageway connecting the inlet to the outlet; a valve member reciprocatable within said passageway to open or close the valve; and a steppable counting mechanism stepped with each new application of pressurized fluid to said inlet and effective to reciprocate said valve member to open or close said passageway after the counting mechanism has been stepped a predetermined number of times, said steppable counting mechanism comprising a pair of nestable cup-shaped members including an inner cup-shaped member fixed to and closing one end of the housing and an outer cup-shaped member rotatably coupled to the valve member so that the outer cup-shaped member is reciprocated with the valve member but is rotatable with respect thereto, and cooperable indexing elements carried by said inner and outer cup-shaped members to rotate the outer cup-shaped member one step around the inner cup-shaped member and around the valve member with each reciprocation of the valve member.

2. A valve according to claim 1, wherein said valve member is a piston reciprocatable in a cylindrical portion of the said housing between the housing inlet and outlet, said inner cup-shaped member being an extension of said housing alined with said piston, said piston including a stem passing through an opening in the end wall of said fixed cup-shaped member and rotatably coupled to an end wall in the outer cup-shaped member.

3. A valve according to claim 1, wherein said valve member is a flanged hollow tube reciprocatable with respect to a piston fixed to the housing, said hollow tube passing through an opening in the end wall of said inner cup-shaped member and rotatably coupled to an end wall in the outer cup-shaped member.

4. A valve according to claim 1, wherein said cooperable indexing elements comprise a pin carried on the outer rotatable cup-shaped member engageable with teeth formed on the inner fixed cup-shaped member.

* * * * *